(12) United States Patent
Wallström et al.

(10) Patent No.: US 7,144,072 B2
(45) Date of Patent: Dec. 5, 2006

(54) BEAM AND METHOD OF MAKING SAME

(75) Inventors: Ingemar Wallström, Göteborg (SE); Göran Berglund, Gammelstad (SE); Mats Lindberg, Luleå (SE)

(73) Assignee: Accra Teknik AB, Ojebyn (SE)

( * ) Notice: Subject to any disclaimer, the term of this patent is extended or adjusted under 35 U.S.C. 154(b) by 0 days.

(21) Appl. No.: 10/486,980

(22) PCT Filed: Sep. 2, 2002

(86) PCT No.: PCT/SE02/01566

§ 371 (c)(1),
(2), (4) Date: Mar. 16, 2004

(87) PCT Pub. No.: WO03/018338

PCT Pub. Date: Mar. 6, 2003

(65) Prior Publication Data

US 2005/0225115 A1    Oct. 13, 2005

(30) Foreign Application Priority Data

Aug. 31, 2001   (SE)   .................................... 0102914

(51) Int. Cl.
*B62D 25/00* (2006.01)
*B60J 5/00* (2006.01)
(52) U.S. Cl. .............................. 296/187.03; 296/146.6
(58) Field of Classification Search ............. 296/146.6, 296/187.03, 187.12
See application file for complete search history.

(56) References Cited

U.S. PATENT DOCUMENTS

| | | | |
|---|---|---|---|
| 3,905,630 A * | 9/1975 | Cantrell | ...................... 293/102 |
| 5,222,564 A * | 6/1993 | Bonca | ........................ 173/189 |
| 5,540,016 A | 7/1996 | Clausen | |
| 6,352,297 B1 * | 3/2002 | Sundgren et al. | ........... 296/102 |

FOREIGN PATENT DOCUMENTS

| | | |
|---|---|---|
| DE | 4224303 A1 | 1/1994 |
| DE | 4421934 A1 | 1/1996 |
| DE | 19525347 C1 | 7/1996 |
| EP | 0870649 A2 | 10/1998 |
| GB | 2101535 A | 1/1983 |
| WO | WO 8302575 A1 | 8/1983 |
| WO | WO 9924278 A1 | 5/1999 |
| WO | WO 00/17464 A | 3/2000 |
| WO | WO 00/35610 | 6/2000 |
| WO | WO 0144018 A1 | 6/2001 |

* cited by examiner

*Primary Examiner*—Dennis H. Pedder
(74) *Attorney, Agent, or Firm*—Ware, Fressola, Van der Sluys & Adolphson LLP

(57) ABSTRACT

A beam is provided for absorbing impact forces imparted to doors and sides of a vehicle body as a result of collisions from the side as well as from the front and rear of the vehicle. The beam (17, 18, 78, 88) is intended to protect people or goods inside the vehicle against personal injury or damage in the case of such an impact. The beam (17, 18, 78, 88) comprises at least one thin walled, closed profile roll formed member (52, 62, 72, 82) defining a cavity (63, 83). At least one wall of the member defines at least one longitudinally extending groove (53, 65, 73, 81). The beam (17, 18, 78, 88) may also be used as a standard building block for structural components.

30 Claims, 3 Drawing Sheets

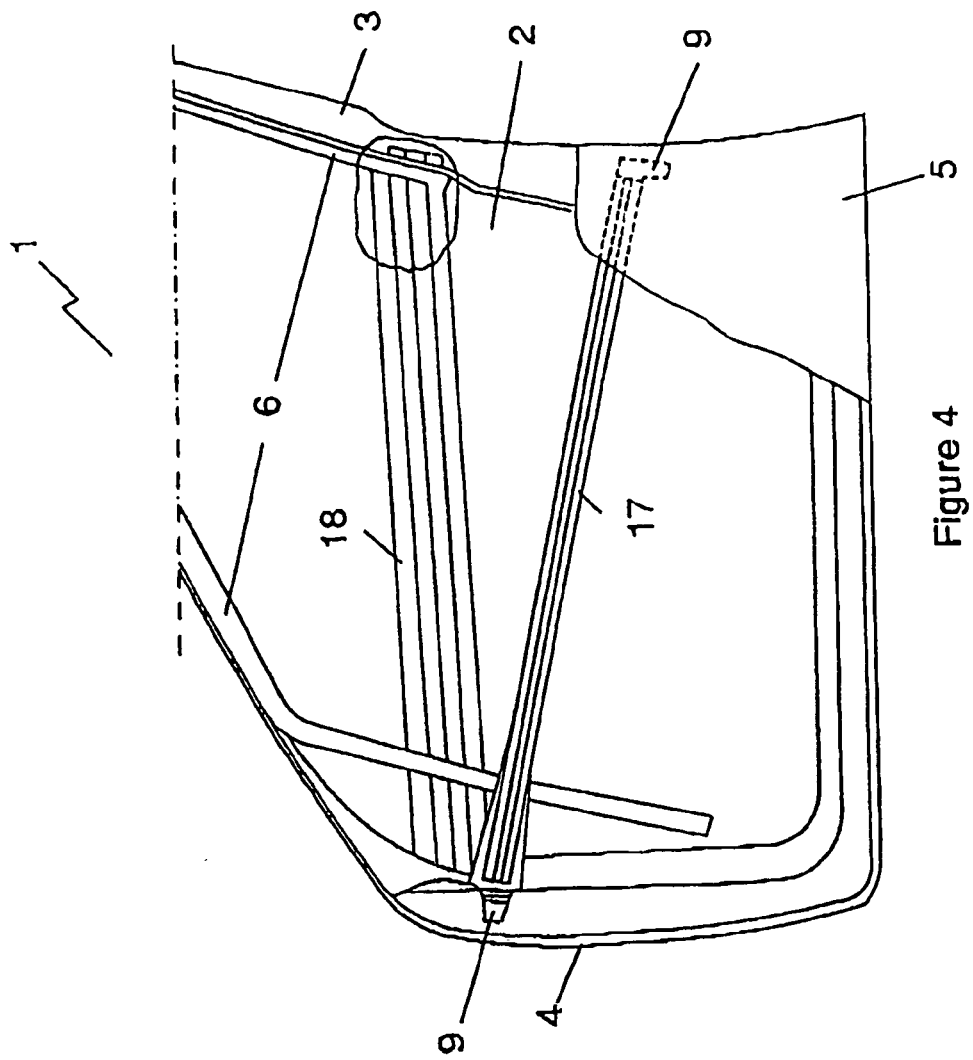
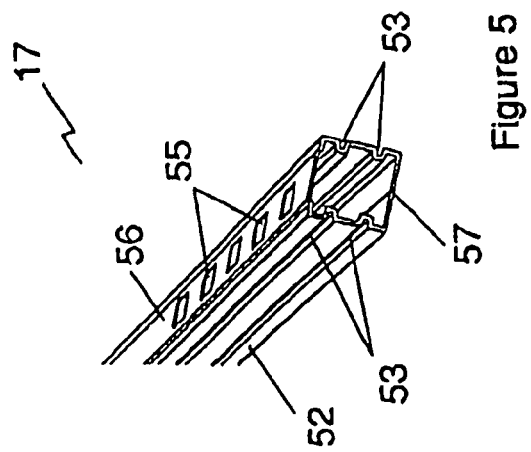

BEAM AND METHOD OF MAKING SAME

BACKGROUND OF THE INVENTION

1. Technical Field

The present invention relates to a beam and in particular to a beam for absorbing impact forces imparted to doors and sides of a car body as a result of collisions from the side as well as from the front and rear of the car. The beam is intended to protect people inside the car against personal injury in the case of such an impact.

2. Description of the Background Art

The need for special side impact protection for motorcar doors arose in the early 1970's after a decision from the U.S. National Highway Traffic Safety Administration (NHTSA) required all cars sold in the USA to have side doors that provide protection against intrusion, "Static Door Intrusion—FMVSS 214". The European Union has since adopted corresponding requirements. Additional requirements have also been implemented by car manufacturers to provide impact absorption areas in door structures for various kinds of front and rear-end collisions.

The automotive industries efforts regarding environmental aspects have mainly focused on efficient emission control and reduced emission levels. Stricter emission control regulations and increased fuel prices are a driving force behind reducing fuel consumption in motorcars. This is being achieved by the construction of engines with improved fuel economy and lower emission levels, and new design solutions which make cars lighter. In practice, this involves using new design solutions and lighter body components. Lighter components, however, must not impair collision safety and newly developed body designs must instead be lighter and stronger than they have been up to the present day.

A number of patent and patent application specifications disclosed in the prior art disclose a number of beams for these and other purposes and are briefly described below. International Publication No. WO 00/17464A discloses a thick-walled beam section, "Floor beam", with wide longitudinal channels and a bottom flange intended to support prefabricated building elements cast in concrete for the construction industry. U.S. Pat. No. 5,540,016 "Structural Beam" describes a door reinforcement member for vehicles formed by extruding aluminium alloy with varying material thickness along its length on two sides. The purpose of the member is to obtain optimum strength and energy absorption in relation to its weight. International Publication No. WO 00/35610 "Structural member" describes a structural beam for e.g. vehicle bumper rails of extruded aluminium alloy with double hollow sections of variable height along its length with the purpose of obtaining optimum strength and energy absorption in relation to its weight.

The main objective of the present invention is to achieve a new and lighter beam element that also offers a flexible use of the basic beam structure having a minimum cross-section and a standarized profile. The advantages of such a beam are that it is compact and a complete solution is obtainable from the drawing board. There are also low product development costs, a short design time, low test-specimen costs and low production tool costs.

Accordingly, the present invention provides a beam for absorbing impact farces characterized in that the beam is provided by at least one thin walled, closed profile roll formed member defining a cavity wherein at least one wall of the member defines at least one longitudinally extending groove.

Preferably, the beam comprises more than one member and adjacent members are connected by an integrally formed web section.

Ideally, any wall of the member defining a groove is orientated substantially perpendicular to the direction of impact forces.

Ideally, the beam is formed from a steel material having a relatively low yield point in the unhardened state. The material from which the beam is formed has a low yield point of approximately 340 MPa but the yield point of the formed beam is extremely high due to the manufacturing and hardening process, approximately 1100 MPa. The beam has no special type of flanges and thereby obtains a low-weight beam structure.

In material with a high stress/strain relationship, buckling phenomena can often be a limiting factor and can lead to the beam section collapsing. In order to increase the efficiency of the section's modulus of rigidity/capacity and to provide impact protection with the desired absorption of collision energy during deformation by retaining a high modulus of rigidity in the case of deep intrusion, the beam is provided with one or more longitudinal grooves extending inwardly towards or outwardly from the center of the beam.

Preferably, the dimensions of the longitudinal grooves are dependent upon both the wall thickness and the lateral length of the wall of the beam in which the longitudinal groove is housed. As the lateral length of the beam increases, it is necessary to increase the depth of the groove in order to maintain the optimal efficiency of the beams modulus of rigidity/capacity.

Preferably, the dimensions of a groove for a normal wall thickness in the range of 0.7–1.0 mm are 3 mm in depth, 3 mm in width and with a small corner radius.

Preferably, the corners of the beam are provided with corner radii which are small relative to the material thickness of the beam, when the beam is non-cylindrical. The small radii are achievable as the material has a low tensile strength during the roll forming process prior to the heat-treating process. The corner radii are small in comparison with corner radii which may be formed when using materials with a high tensile strength and the same or similar material thickness.

Preferably, the steel is a steel alloy sheet.

Ideally, the steel is boron steel.

In a preferred embodiment, pre-coated steel having a corrosion protective coat is used. The use of this type of pre-coated steel removes the need for expensive coating processes after forming.

In a particularly preferred embodiment, the coating material is USIBOR 1500 PRE-COATED.

Preferably, the thin-walled hollow beam has a normal material thickness in the range of 0.7–1.8 mm.

Ideally, a seam weld extending between the longitudinal edges of the member closes the beam. The seam weld extends along the entire longitudinal length of the beam.

Preferably, a seam weld extending between the longitudinal edges of each member and the integrally formed web section closes the beam.

Ideally, the material throughout the closed profile beam including the seam weld has a yield point of at least 1100 MPa. The yield point of the steel combined with the efficient design is distinguished from corresponding known designs of side impact protection. Such designs include circular steel tube sections, high-alloy aluminium sections with yield point of approximately 360 MPa, cold-pressed open beams of high-tensile steel and open beams of hardened boron steel produced through hot pressing.

Ideally, at least one wall of the member defines laterally extending stiffening grooves.

Preferably, the laterally extending stiffening grooves project mainly inwardly from a wall of the member and are equispaced from one another along the wall of the member.

In a further aspect of the invention, the yield point of the material used on any predetermined longitudinal sections of the beam is on a lower level approximately 340 MPa when compared with the yield point of at least 1100 MPa for the rest of the beam.

Preferably, a section of the beam with a lower yield point is located adjacent the normal sitting position of a car seat occupant. The section of the beam striking the occupant during a side impact collision will be more susceptible to deformation thereby reducing the injuries caused to the occupant by the beam as a result of an intrusion.

In another aspect of the invention, the beams are formed for inter-engagement with one another by means of correspondingly located mating parts wherein a number of beams may be assembled together to build a wall element.

Preferably, each beam is provided wit a male part and a female part for mating with adjacent beams. This arrangement is particularly useful for use in the side, front and rear walls of transport vehicles such as articulated trucks. The wall elements built from the beams absorb impacts from heavy articles inside the container which may have come loose during transportation or absorb impacts as a result of external collisions wit other objects or vehicles. The beams may also be used in the building industry to assemble structural elements having similar strength requirements.

The present invention also provides an impact protection assembly comprising at least an outer beam mounted on a door between door ends wherein the beam is provided by at least one thin walled, closed profile roll formed member defining a cavity wherein at least one wall of the member defines at least one longitudinally extending groove.

Preferably, the impact protection assembly comprises an outer beam and an upper beam, the outer beam being mounted between the door ends and the upper beam being mounted on the inner door panel between the door ends. The upper beam takes a substantial portion of the impact load during a front or rear collision which reduces the risk of a door buckling inwards or outwards during a collision. This helps to maintain the compartment space afforded to a vehicle occupant during a collision.

Ideally, the upper beam comprises two members connected by a web section and the outer beam comprises a single member.

Preferably, both of the members of the upper beam are provided with a single longitudinally extending groove on one corresponding wall of each member and the single member of the outer beam defines two grooves on two opposite walls of the member and laterally extending stiffening grooves on at least one other wall.

Ideally, when a car is provided with only two doors, the beams are welded onto the coachworks of the car where rear door side impact protection would normally be located in order to provide protection for passengers in the rear of the vehicle.

The present invention also provides a method of manufacturing a beam for absorbing impact forces wherein at least one thin walled, closed profile member is roll formed with at least one longitudinally extending groove on at least one wall of the member while the sheet material is still in its unhardened state.

Advantageously, the method gives high material utilization. A low total amount of steel material is required in the roll forming process of a comparatively thin profile clement. This gives an extremely high material utilization which offers a favorable environmental impact (environment factor) during manufacture compared with the environmental impact from other existing designs of side impact protection in doors. This quality is nowadays an important factor within the automotive industry when selecting materials and designs for a function/component. The entire vehicle is considered and environmentally calculated with an environment declaration for the individual functions/components.

Preferably, the method includes the step of roll forming lateral stiffening grooves into at least one wall of the member.

Ideally, the method also provides for the rolling of corner radii which are small relative to the material thickness into one or more of the corners of the beam.

Preferably, the method of manufacturing the beam also includes the steps of joining a seam with a continuous weld; passing the beam through induction coils; heating to a hardening temperature; cooling by spraying water directly onto the beam and finally cutting the beam to the necessary length.

Ideally, the method of manufacturing the beam includes the step of applying a tension to the leading edge of the beam to improve the straightness of the beam. The tension is applied to the beam by running the rollers at the end of the production line at a slightly increased speed relative to the other rollers. This maintains a constant tensile force on the beam as it passes through the production apparatus.

Preferably, the rollers at the end of the production line are positioned in order to form the beam by bending over the entire length of the beam. The desirable radius of curvature applied to the beam is extremely large and typically although not exclusively) for a beam having a length of 1 meter there is an approximate displacement of 10 mm from the straight position for the midpoint of the beam after forming.

Ideally, the hardening temperature is approximately 920° C.

Preferably, the beam is welded in its hardened state to attachment brackets or directly to adjacent structural members.

Preferably, the method includes the step of local heating of predetermined longitudinal sections of the beam by means of inductive heating to tempering temperature with subsequent cooling in order to produce a beam having independent yield strength values for individual longitudinal sections of the beam. In this way, the risk of personal injury to hips/shoulders can be reduced as predetermined longitudinal sections of such a beam deform more readily due to their reduced yield strength value.

BRIEF DESCRIPTION OF THE DRAWINGS

The invention will now be described with reference to the accompanying drawings, which shown, by way of example only, four embodiments of a beam in accordance with the invention. In the drawings:

FIG. 4 is a schematic representation of the motorcar door of FIG. 1 with an impact protection assembly using beams according to the present invention;

FIG. 5 shows a partial perspective view of an outer beam of the protection assembly of FIG. 4;

DETAILED DESCRIPTION OF THE INVENTION

Figure 1:
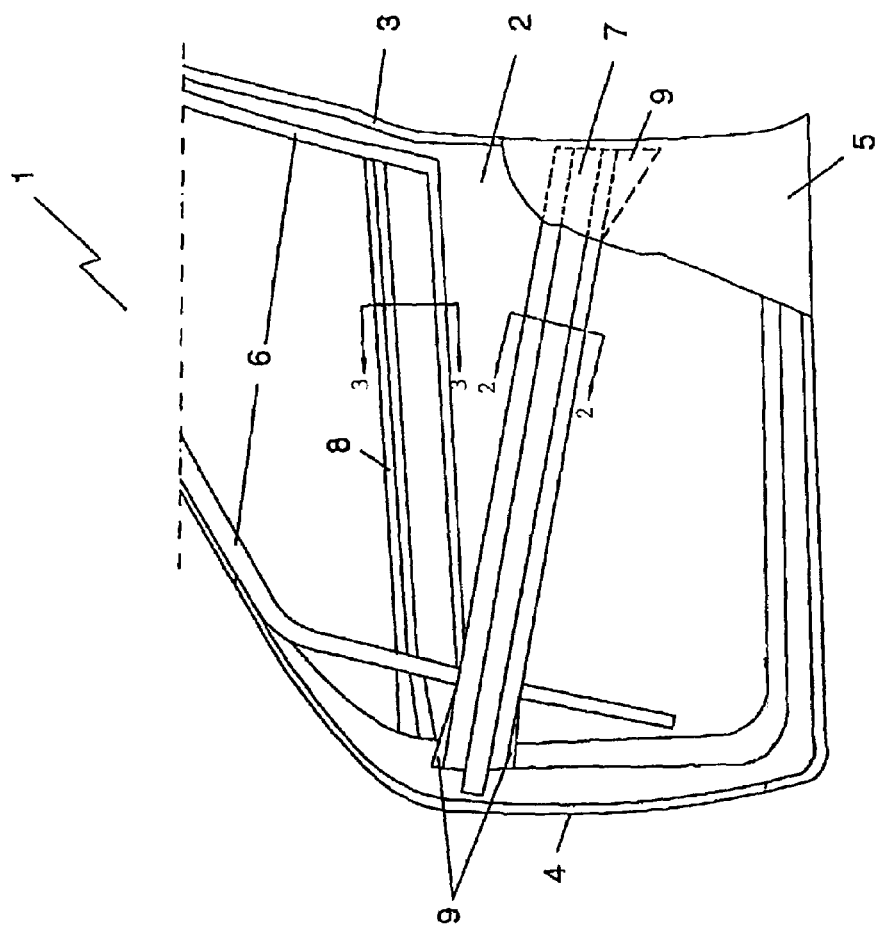
FIG. 1 is a schematic representation of a motorcar door with an impact protection assembly using conventional beams.

Referring to the drawings and initially to FIG. 1, there is shown a schematic illustration of a standard car door indicated generally by the reference numeral 1 comprising a number of structural components which are joined together. An inner door panel 2 is integrally formed with door ends 3 and 4. An outer door panel 5 (of which only the bottom right hand corner is shown) is mounted on the inner door panel 2. The prior art impact protection assembly comprises an outer beam 7 and an upper beam 8 separated from one another. The outer beam 7 is attached to the door ends 3 and 4 and can also be attached to an inner face of the outer door panel 5 with adhesive. The upper beam 8 is attached to the inner surface of the door panel 2 by spot weld. Rails 6 which are used to guide a window (not shown) of the door 1 and are mounted between the door ends 3 and 4. Beam 7 has been provided with brackets 9 in order to fix the beam 7 to a predetermined position between the door ends 3 and 4.

Figure 2:
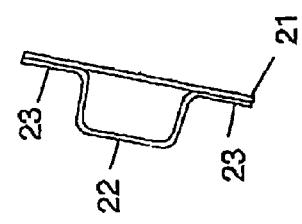
FIG. 2 shows a cross-section view through an outer beam of the protection assembly along the 2—2 line of FIG. 1.
Figure 3:
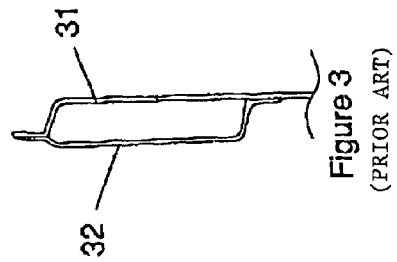
FIG. 3 shows a cross-section view through an upper beam of the protection assembly along the 3—3 line of FIG. 1.

Referring to FIG. 2 there is shown a conventional construction of outer beam 7. In this embodiment, the beam 7 is formed by joining a flat base 21 with a channel section 22 having a pair of integrally formed flanges 23 suitable for fixing to the base 21. FIG. 3 shows a conventional construction of upper beam 8 formed by joining an open section member 32 to the upper part 31 of the inner door panel 2 by welding or some similar fixing means.

Referring now to FIG. 4, the schematic illustration of the motorcar door indicated generally by the reference numeral 1 is identical to the door of FIG. 1 which is described in detail above. Therefore the detailed description of FIG. 1 relating to the door is applicable to the door of FIG. 4 and identical parts have been designated identical reference numerals. For the purposes of clarity and to clearly distinguish the present invention over the prior art, the outer beam of the impact protection assembly of the present invention has been assigned the reference numeral 17 and the upper beam has been assigned the reference numeral 18.

Referring now to FIG. 5 the outer beam is indicated generally by the reference numeral 17 and is provided by a roll formed closed profile member 52 having a substantially rectangular cross-section. Two grooves 53 are provided on two opposite walls of the member 52 and a number of lateral stiffening grooves 55 are roll formed onto one wall 56 of the member 52. It will of course be appreciate that stiffening grooves 55 may be roll formed onto more than one wall of the member 52. The outer beam 17 is closed by seam welding the two longitudinal edges of the member 52 together along seam 57.

Figure 6:
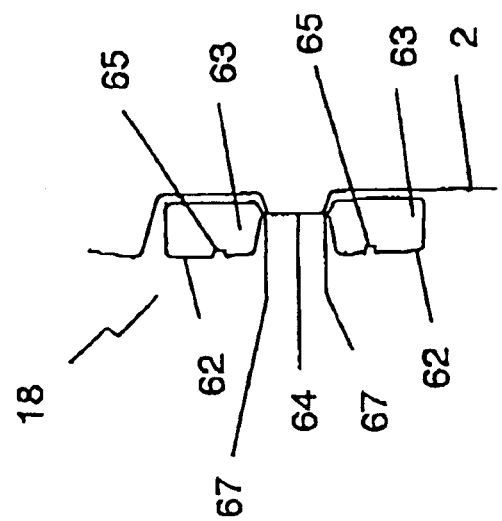
FIG. 6 shows a cross-section side view through an upper beam of the protection assembly of FIG. 4.
Figure 7:
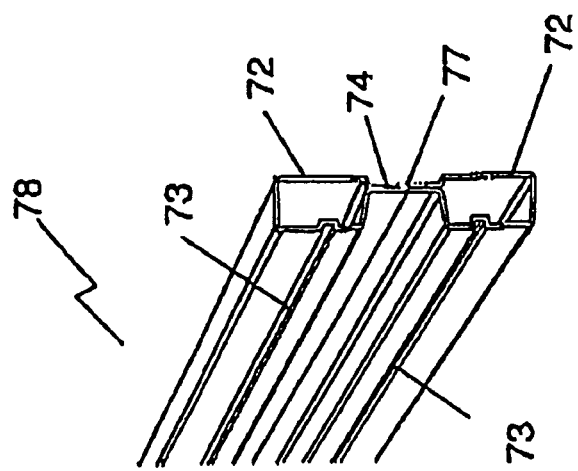
FIG. 7 shows a partial perspective view of a second embodiment of an upper beam of the protection assembly of FIG. 4.

Referring now to FIG. 6, there is shown an upper beam indicated generally by the reference numeral 18 provided by two members 62 defining two cavities 63. An intermediate web section 64 consisting of a single sheet of material connects the members 62 and the members 62 are closed by seams 67 extending between the longitudinal edges of the members 62 and the web section 64. The web section 64 forms a surface for welding to the inner door panel 2 and a single longitudinally extending groove 65 is provided on one wall of each member 62. FIG. 7 shows an upper beam indicated generally by the reference numeral 78 similar to the beam 18 shown in FIG. 6. In this embodiment, double sheets of material with a single weld seam 77 provide the intermediate web section 74. The web section 74 forms a surface for welding to the inner door panel 2 and a single groove 73 is provided on one wall of each member 72.

In use, the outer beam 17 is located directly behind the outer door panel and takes the form of a beam for bending forces coming from the side. The upper door protection 18, 78 is provided mainly for impact from the front/rear but can also absorb bending forces from the side.

Figure 8:
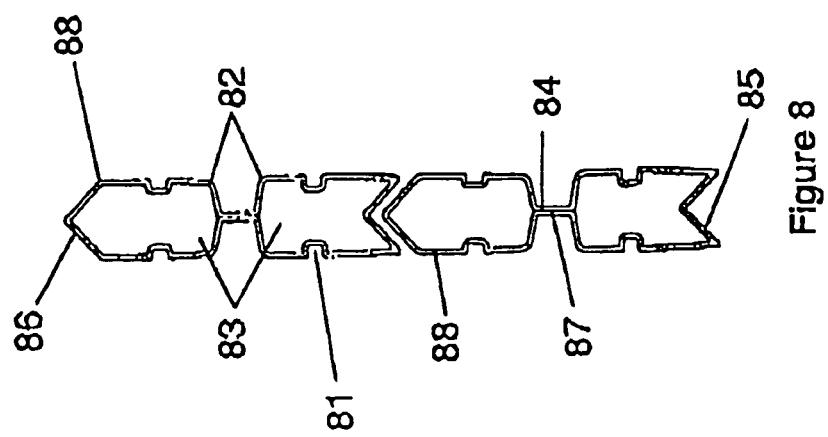
FIG. 8 shows a cross section view of a fourth embodiment of a beam in accordance with the invention.

Referring now to FIG. 8, there is shown two beams 88 formed for inter-engagement. Each beam 88 is provided by two members 82 defining two cavities 83. An intermediate web section 84 consisting of a double sheet of material connects the members 82 and the members 82 are closed by a seam weld 87 extending between the longitudinal edges of the members 82. One end of each beam 88 is formed with a female part 85 and the other end of each beam 88 is formed with a male part 86. A longitudinal groove 81 is provided on opposite walls of each member 82. The beams 88 are stacked one on top of another to form a structural element.

It will of course be understood that the invention is not limited to the specific details as herein described, which are given by way of example only, and that various alterations and modifications may be made without departing from the scope of the invention as defined in the appended claims.

The invention claimed is:

1. A beam for absorbing impact forces comprising at least one thin walled, closed profile roll formed member of sheet metal defining a cavity wherein at least one wall of the at least one member defines at least one longitudinally extending stiffening groove, the at least one groove is orientated substantially perpendicular to the direction of potential impact forces towards the beam, the sheet metal is comprised of a steel material capable of being hardened and which has a tensile yield limit of approximately 340 MPa in its unhardened state and in its hardened state after accomplished roll forming a tensile yield limit of at least 1100 MPa, the at least one member has at least one predetermined longitudinal section with a yield limit of approximately 340 MPa as compared with a yield point of at least 1100 MPa for the rest of the beam.

2. A beam as claimed in claim 1, wherein the at least one member comprises at least two adjacent members and the adjacent members are connected by an integrally formed web section.

3. A beam as claimed in claim 2, wherein each adjacent member is joined to the integrally formed web section by a seam weld to close the adjacent member.

4. A beam as claimed in claim 1, wherein the at least one longitudinally extending groove is dimensionally sized based upon both wall thickness and lateral length of the at least one wall in which at least one longitudinally extending groove is housed.

5. A beam as claimed in claim 4, wherein the at least one wall has a wall thickness in a range of between 0.7 and 1.0 mm and the at least one longitudinally extending groove has a depth of 3 mm, a width of 3 mm and a small corner radius.

6. A beam as claimed in claim 1, wherein at least one member is non-cylindrical and has corners provided with corner radii which are small relative to the thickness of the sheet metal.

7. A beam as claimed in claim 1, wherein the sheet metal is a steel alloy sheet.

8. A beam as claimed in claim 7, wherein the steel alloy sheet is boron steel.

9. A beam as claimed in claim 1, wherein the sheet metal has a thickness in a range of between 0.7 and 1.8 mm.

10. A beam as claimed in claim 1, wherein the at least one member is closed by a longitudinally extending seam weld.

11. A beam as claimed in claim 10, wherein the seam weld has a yield point of at least 1100 MPa.

12. A beam as claimed in claim 1, wherein at least one wall of the at least one member defines laterally extending stiffening grooves.

13. A beam as claimed in claim 12, wherein the laterally extending grooves project inwardly from the at least one member and are equispaced from one another along the at least one wall of the at least one member.

14. A beam as claimed in claim 1, wherein the at least one longitudinal section with the yield limit of approximately 340 MPa is for locating adjacent a normal sitting position of a car seat occupant.

15. An impact protection assembly for a door having a door frame, an inner door panel and door ends comprising at least an outer beam mounted on the door between the door ends, the outer beam having at least one thin walled, closed profile roll formed member of sheet metal defining a cavity wherein at least one wall of the at least one member defines at least one longitudinally extending stiffening groove, the at least one groove is orientated substantially perpendicular to the direction of potential impact forces towards the beam, the sheet metal is comprised of a steel material capable of being hardened and which has a tensile yield limit of approximately 340 MPa in its unhardened state and in its hardened state after accomplished roll forming a tensile yield limit of at least 1100 MPa, the at least one member has at least one predetermined longitudinal section with a yield limit of approximately 340 MPa as compared with a yield point of at least 1100 MPa for the rest of the beam.

16. An impact protection assembly as claimed in claim 15, further comprising an upper beam mounted on a door frame on the inner door panel between the door ends.

17. An impact protection assembly as claimed in claim 16, wherein the upper beam comprises two members connected by a web section and the outer beam comprises a single member.

18. An impact protection assembly as claimed in claim 17, wherein both of the members of the upper beam are provided with a single longitudinally extending groove on one corresponding wall of each member and the at least one member of the outer beam defines two grooves on two opposite walls of the at least one member and laterally extending stiffening grooves on at least one other wall.

19. A method of manufacturing a beam for absorbing impact forces comprising the steps of:
(a) providing steel sheet metal;
(b) forming the sheet metal into at least one thin walled, closed profile member having at least one longitudinally extending stiffening groove on at least one wall of the member, the at least one groove orientated substantially perpendicular to a direction of potential impact forces towards the beam;
(c) locally heating predetermined longitudinal sections of the beam by inductive heating to tempering temperature; and
(d) cooling the predetermined longitudinal sections to have independent yield strength values.

20. A method as claimed in claim 19, wherein the sheet metal is a hardenable steel having a tensile yield limit of approximately 340 MPa in an unhardened state and a tensile yield limit of at least 1100 MPa in a hardened state, wherein each predetermined longitudinal section has a yield limit of approximately 340 MPa compared with the yield point of at least 1100 MPa for the rest of the beam.

21. A method as claimed in claim 19, further including the step of roll forming lateral stiffening grooves into at least one wall of the member.

22. A method as claimed in claim 19, wherein the forming step includes the step of roll forming corners on at least one thin walled, closed profile member with corner radii which are small relative to the thickness of the sheet metal.

23. A method as claimed in claim 19, further including the steps of joining a seam with a continuous weld, passing the beam through induction coils to heat the predetermined longitudinal sections to a hardening temperature, spraying water directly onto the beam and cutting the beam to a necessary length.

24. A method as claimed in claim 23, further including the step of applying a tension to a leading edge of the beam to improve the straightness of the beam.

25. A method as claimed in claim 24, wherein the tension is applied by the rollers at the end of the production line positioned to form the beam by bending over the entire length of the beam.

26. A method as claimed in claim 23, wherein the hardening temperature is approximately 920° C.

27. A method as claimed in claim 19, further including the step of applying a tension to a leading edge of the beam to improve the straightness of the beam.

28. A method as claimed in claim 27, wherein the tension is applied by the rollers at the end of the production line positioned to form the beam by bending over the entire length of the beam.

29. A method as claimed in claim 19, further including the step of welding attachment brackets to the at least one thin walled, closed profile member after the cooling step.

30. A method as claimed in claim 19, further including the step of welding the at least one thin walled, closed profile member to adjacent structural members after the cooling step.

* * * * *